Oct. 10, 1939.  C. R. PALMER  2,176,003
CASING FOR THERMOMETERS
Original Filed Jan. 24, 1938

INVENTOR.
Charles R. Palmer
BY Wood & Wood
ATTORNEYS.

Patented Oct. 10, 1939

2,176,003

UNITED STATES PATENT OFFICE 2,176,003

CASING FOR THERMOMETERS

Charles R. Palmer, Glen Acres, Ohio, assignor to The Palmer Company, Norwood, Ohio, a corporation of Ohio Original application January 24, 1938, Serial No. 186,503. Divided and this application September 16, 1938, Serial No. 230,293

5 Claims. (Cl. 73—376)

This invention relates to a protective casing for a thermometer which is particularly adapted to be clipped in an aperture in a wall or partition panel of a refrigerator, stove oven, or the like, for ready and convenient installation or removal.

This application is a division of my copending application, Serial No. 186,503, filed January 24, 1938, in which I disclose a thermometer of a type particularly designed for refrigerator use. The casing which is the subject matter of this application is, however, well adapted to enclose thermometers of a type other than that disclosed in my copending application.

One of the objects of my invention has been to provide a protective casing for a thermometer, the casing being designed to be detachably inserted into an aperture in the wall or in the surface of a domestic ice box or electric refrigerator.

The second object of my invention has been to provide attaching means adapted to hold a thermometer and casing securely in position in an aperture in a wall or in the surface of a domestic ice box or electric refrigerator and, at the same time, to permit the thermometer and casing to be readily detached when desired.

Another object of my invention has been to provide a protective casing adapted to hold a thermometer in the surface of an electric refrigerator or the like, and so constructed that the column of mercury or other thermally expansible fluid in the thermometer will be more readily apparent to the observer because of the casing construction, which permits the passage of light rays from an electric bulb positioned in the wall of the refrigerator behind the thermometer through the fluid column.

Other objects and purposes will be apparent in the further and more detailed description of my invention, in which.

In the use of the thermometer of my invention for refrigerator purposes, it is contemplated that the thermometer may be detachably inserted in an inner wall of the refrigerator. As the thermometer is regarded as an accessory to the refrigerator, it is desirable to have the same readily removable, particularly if the thermometer should become broken. In order to provide for this contingency, I have devised an effective means for attaching and detaching the thermometer to and from a location, such as the surface of the inner wall of the refrigerator. At the same time the thermometer is so protected that there is little likelihood that it will be broken in the attaching or detaching operation.

Figure 1:
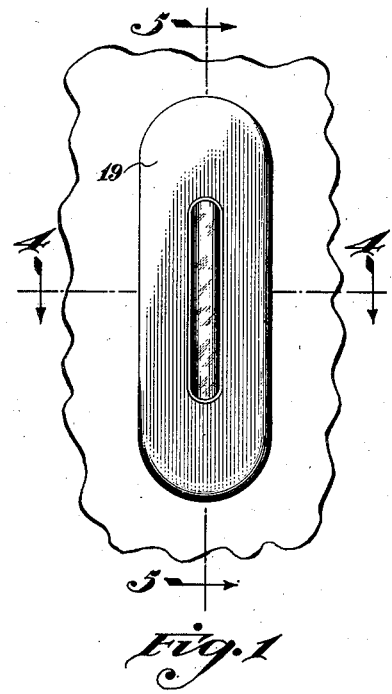
Figure 1 is a front elevation of a thermometer of the type of my invention specifically adapted for use in a domestic ice box or electric refrigerator, and it illustrates the thermometer and casing in attached position, with only a portion of the entire tube visible through the front aperture in the casing.
Figure 2:
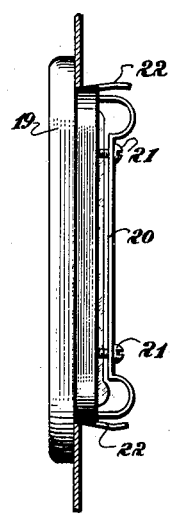
Figure 2 is a side elevation of the same thermometer particularly illustrating the preferred construction of the casing, including, the base piece or frame portion, the back protective member, and the attaching clips. In this view, the thermometer is in fully attached position.
Figure 3:
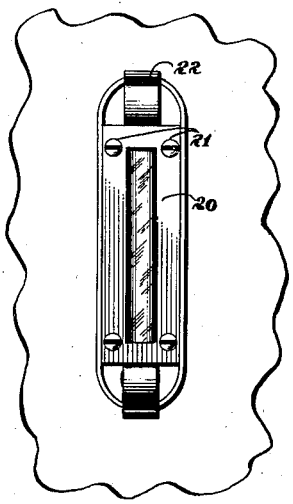
Figure 3 is a rear elevation of the same thermometer showing particularly the construction of the rear of the back protective member.
Figure 4:
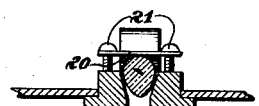
Figure 4 is a sectional view taken on line 4—4, Figure 1.

As disclosed in the drawing, Figures 1-7, I provide a protective base piece, or frame, 19 which completely surrounds the sides and top of the thermometer tube and bulb. This frame may be configurated in the manner particularly disclosed in Figures 1 and 2, although the exact configuration is immaterial as long as an effective means is provided for protecting the thermometer from outer shocks. The back of the thermometer is protected, and the thermometer itself is held firmly against the inner surface of the base piece by the detachable back protective member 20, shown in Figures 3 and 4. This member may comprise a single piece of metal or the like and should be configurated to hold the thermometer tube firmly against the base piece, and at the same time, to protect the bulb without exerting pressure against it. It may be readily detached by means of the screws 21. An open slot may be utilized in the rear of the back protective member, as shown in Figures 3 and 4, so that a light, located in the refrigerator wall behind the thermometer, will illuminate the thermometer tube and still further facilitate the determination of temperatures.

Figure 5:
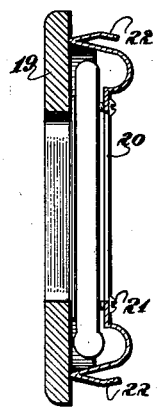
Figure 5 is a sectional view taken on line 5—5, Figure 1, particularly illustrating the position of the aperture in the frame portion of the casing when the thermometer is in attached position.
Figure 6:
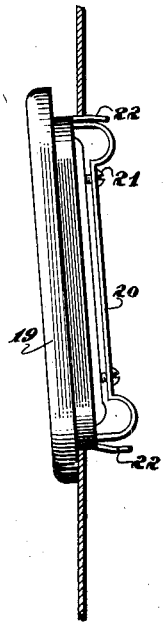
Figure 6 is a sectional view similar to Figure 2 showing the thermometer in partially attached or detached position, and particularly illustrating the spring action of the clips during the attaching or detaching operation.

The attaching and detaching clips 22 are shown extended in attached position in Figure 2 and in Figure 5. Figure 6 shows them compressed in an actual attaching or detaching operation. These clips may be a component part of the back protective member 20, or may be separate elements imbedded in the base piece 19. They may be made from spring metal of almost any kind, or from other resilient material.

When it is desired to detach the thermometer, enclosed within the protective casing hereinbefore described, from a preformed slot or aperture in the interior wall of the refrigerator, a slight amount of pressure behind the front surface of the base piece is sufficient to accomplish the desired result. The thermometer can then be removed from the casing by unscrewing the back protective member. If properly constructed in the manner hereinbefore disclosed, the casing will fit snugly within the aperture and the existence of the aperture will have little effect on the refrigerating efficiency of the refrigerator or ice box. At the same time the mercury bulb, being positioned toward the interior of the refrigerator, will be exposed to the interior temperature, enough to insure a reasonably accurate reading.

Figure 7:
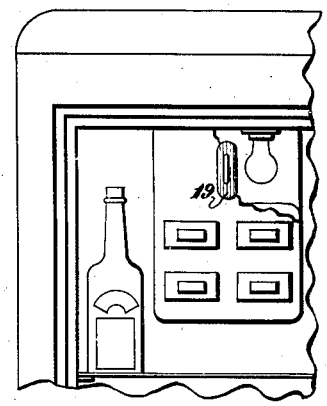
Figure 7 shows the same thermometer actually inserted in an electric refrigerator in a suggested location closely contiguous to an electric light bulb.

The entire structure herein described operates particularly well in an electric refrigerator, which has a light in the interior, as shown in Figure 7. In a structure of this sort, if the thermometer of my invention is located contiguous to the light, the reading of temperature will be greatly facilitated. As previously stated, the reading is still further facilitated if the source of light is located behind the thermometer.

Having described my invention, I claim:

1. A thermometer casing adapted to be positioned in a wall surface, comprising a base piece adapted to frame the thermometer, leaving the reading surface thereof exposed, and a backing detachably secured to the frame portion and adapted to hold the thermometer tube firmly positioned against the frame portion, said backing having an aperture therein to allow the passage of light through the reading surface of the thermometer.

2. A thermometer in combination with a housing therefor, the housing comprising an apertured face plate channeled on its rear side for the reception of the thermometer tube, and exposing a portion of its length through the aperture, and a sheet metal guard fixed to the rear side of the face plate for confining the thermometer tube within the rear of the face plate, the guard having its opposite longitudinal ends configurated for clipping in a wall or panel for sustaining the unit in position for use.

3. A thermometer in combination with a housing therefor, the housing comprising an apertured face plate having its rear side arranged for the reception of the thermometer tube and exposing a portion of its length through the aperture, and an apertured sheet metal guard fixed to the rear side of the face plate for confining the thermometer tube within the rear of the face plate, the aperture in registration with the aperture in the face plate, and means at the opposite longitudinal ends of the guard for clipping the parts as a unit in a wall or panel for sustaining the same in position for use.

4. A thermometer casing comprising a frame portion adapted to fit around the reading face of a thermometer tube, a backing detachably secured to the frame portion and adapted to hold the thermometer tube firmly positioned against the frame portion, said backing having an aperture therein to allow the passage of light through the reading surface of the thermometer, and means associated with the frame portion for clipping the casing in a wall or panel and for sustaining the same in position for use.

5. A thermometer casing adapted to be positioned in a wall surface, comprising a base piece adapted to frame the thermometer, leaving the reading surface thereof exposed, a backing detachably secured to the frame portion and adapted to hold the thermometer tube firmly positioned against the frame portion, and means for clipping the casing in a wall or panel, said clipping means comprising flexible metal extensions of the backing.

CHARLES R. PALMER.